United States Patent

[11] 3,565,196

[72] Inventors Eric Laimins
Belmont;
Charles Kadlec, Acton, Mass.
[21] Appl. No. 831,146
[22] Filed June 6, 1969
[45] Patented Feb. 23, 1971
[73] Assignee B L H Electronics, Inc.
Waltham, Mass.

[54] MOBILE ELECTRICAL WEIGHING PLATFORM
7 Claims, 4 Drawing Figs.
[52] U.S. Cl............................................. 177/211,
73/141
[51] Int. Cl............................................. G01g 3/14
[50] Field of Search............................................. 177/210,
211; 73/141

[56] References Cited
UNITED STATES PATENTS
| | | | |
|---|---|---|---|
| 2,793,851 | 5/1957 | Ruge............................ | 177/211 |
| 2,901,235 | 8/1959 | Bradley....................... | 177/211 |
| 3,123,166 | 3/1964 | Schellentrager............. | 177/211 |
| 3,124,770 | 3/1964 | Ciavatta...................... | 177/211X |

*Primary Examiner*—Robert S. Ward, Jr.
*Attorney*—Thomson & Mrose

ABSTRACT: A mobile electrical weighing platform or scale is suspended for precision measurements of loads by way of a plurality of shear-type load cells which are in purely ball-and-socket engagement with the platform during operation, and which are in entrapped and protected relations to the platform to prevent accidental separation or damage to electrical connections during transport, heightwise adjustment, and self-leveling installation.

INVENTORS:
ERIC LAIMINS
CHARLES KADLEC by
Thomson, Wrose & Ericson
ATTORNEYS

MOBILE ELECTRICAL WEIGHING PLATFORM

BACKGROUND OF THE INVENTION

The present invention relates to improvements in the precision measurement of forces by a plurality of cooperating electrically gauged load cells which stably suspend and respond accurately to vertical components of loading upon a platform structure, and, in one particular aspect, to novel and improved mobile platform-type weighing scales of low-cost, compact, low profile construction wherein a plurality of high precision shear-responsive load cells suspend a rigid platform in relation to underlying support surfaces, each cell being adjustable heightwise and being universally jointed with the platform to accommodate its use upon nonlevel surfaces while nevertheless being protected against environmental influences and against dislodgment.

Electrical strain gauges, such as those of the bonded filament resistance type, have long been used in various transducer devices or load cells; commonly, they are attached to surface areas of elastically deformable elements such as beams, columns and diaphragms, and their tendency is to respond and measure loading only when the applied loads are closely aligned with a predetermined axis of the associated cell. When undesirable side forces occur, the strain gages produce outputs which are erroneous in that they do not precisely characterize the forces along the single measurement axis which is of interest. In this connection, a particularly severe problem is posed by the demands for weighing of aircraft or of loads which are to be placed aboard aircraft; such weighing is often performed with portable scales placed under the aircraft wheels or under wheels or other supports for vehicles or other loads to be carried by cargo planes. It is highly critical that the related measurements, even if made under adverse "field" conditions, be very precise; otherwise the ensuing calculations of gross weight and/or center of gravity can result in errors of grave consequence. For such purposes, the scales must be lightweight and yet rugged, they must be capable of withstanding abuse and neglect and wide ranges of adverse environmental conditions, and they must be operative accurately or uneven terrain under administration of relatively unskilled personnel.

SUMMARY OF THE INVENTION

By way of a summary account of underlying recognitions and of preferred practice of this invention, in one of its aspects, an advantageous platform-type weighing scale which is accurate, readily lends itself to installation and adjustment for use, is of rugged and uncomplicated construction, and is highly immune to uncentered loadings and to unwanted lateral forces, is realized through use of a limited freedom universal jointing between a platform and each of a plurality of shear load cells which suspend it. At each suspension site, the platform is supported on a steel ball socketed in the load-receiving part of a load cells, the load cell in turn being threadedly engaged with a broad area foot or pad which permits height adjustment of the platform for leveling purposes. The cell, ball and platform at each suspension site are in loosely entrapped and sealed relationships which isolate the cell, electrical connections, and socketing from environmental effects and from damage due to rough handling, while at the same time the assembly is adjustable heightwise and is free to adjust itself to dealing only with vertically directed forces when performing measurements.

It is one of the objects of the present invention, therefore, to provide unique and improved platform-type weighing apparatus wherein a plurality of electrical strain gauge transducer units which cooperatively suspend a weighing platform and determine its vertical loadings are substantially isolated from effects of lateral and uncentered loadings and are environmentally and mechanically protected while having limited universal freedom which promotes measurement accuracy.

Another object is to provide high precision, mobile, low profile electrical weighing scales which may be readily installed and adjusted for use on unprepared supporting surfaces, and which involve miniature sensitive load cells which are fully protected from damage due to rough handling and severe environmental conditions.

BRIEF DESCRIPTION OF THE DRAWINGS

Although features of this invention which are considered to be novel are set forth in the appended claims, further details as to preferred practices and as to the further objects, advantages and features thereof may be mostly readily appreciated through reference to the following description taken in connection with the accompanying drawings, wherein:

DESCRIPTION OF THE PREFERRED EMBODIMENT

Figure 1:
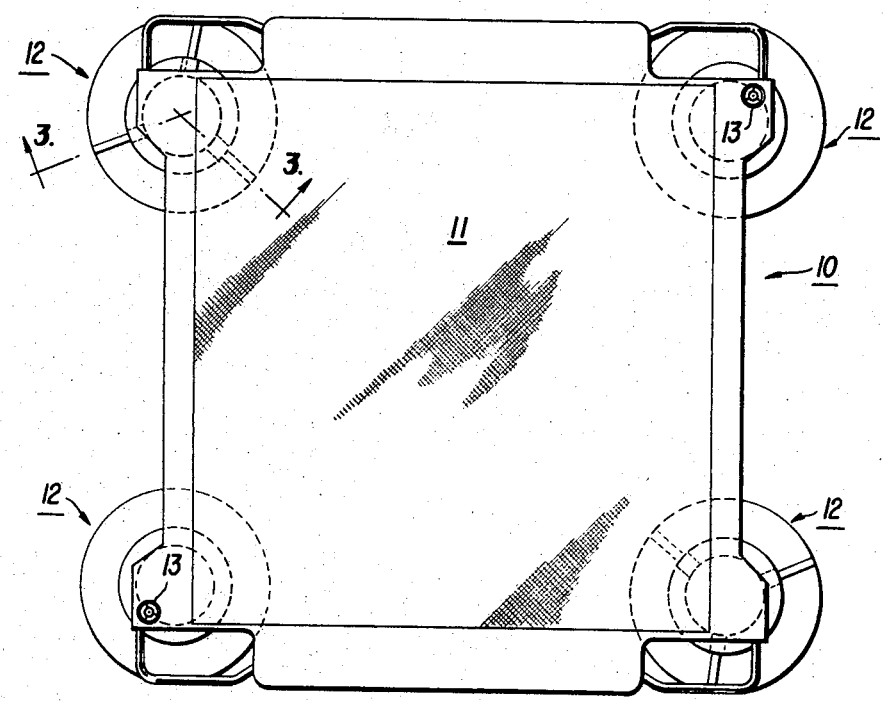
FIG. 1 is a plan view of an improved platform-type electrical weighing scale in which the present invention is used to advantage FIG. 2 provides a side elevational view of the apparatus shown in FIG. 1.
Figure 2:
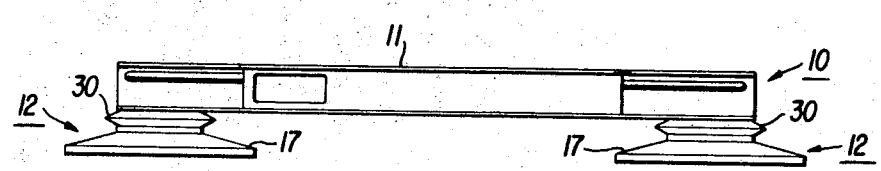

Having reference to the drawings, where in like reference characters designate identical or corresponding parts throughout the several views, the load-measuring or weighing scale apparatus illustrated in FIGS. 1 and 2, and designated by the numeral 10, is of a low height or so-called "low profile" configuration and lends itself particularly well to installation and operation atop an irregular or nonlevel or otherwise unprepared support surface, and is particularly well suited to use in a multiple-scale system for weighing and calculating center of gravity of aircraft and airdrop pallets or other cargo. Its load-receiving upper platform structure is capable of withstanding heavy localized loading, but, uniquely in this combination, may be lightweight even to the point of being permitted to bend or sag under loading, without untoward effect upon the measurements. This platform is suspended in relation to underlying surfaces at each of its four corners, wholly by way of structural transducer units such as that designated by the reference character 12. A pair of bubble-type level indicators, 13, positioned at diagonally opposite corners of the platform, aid in making the levelling adjustments which are preferred for optimum measuring of loads on the platform.

Figure 3:
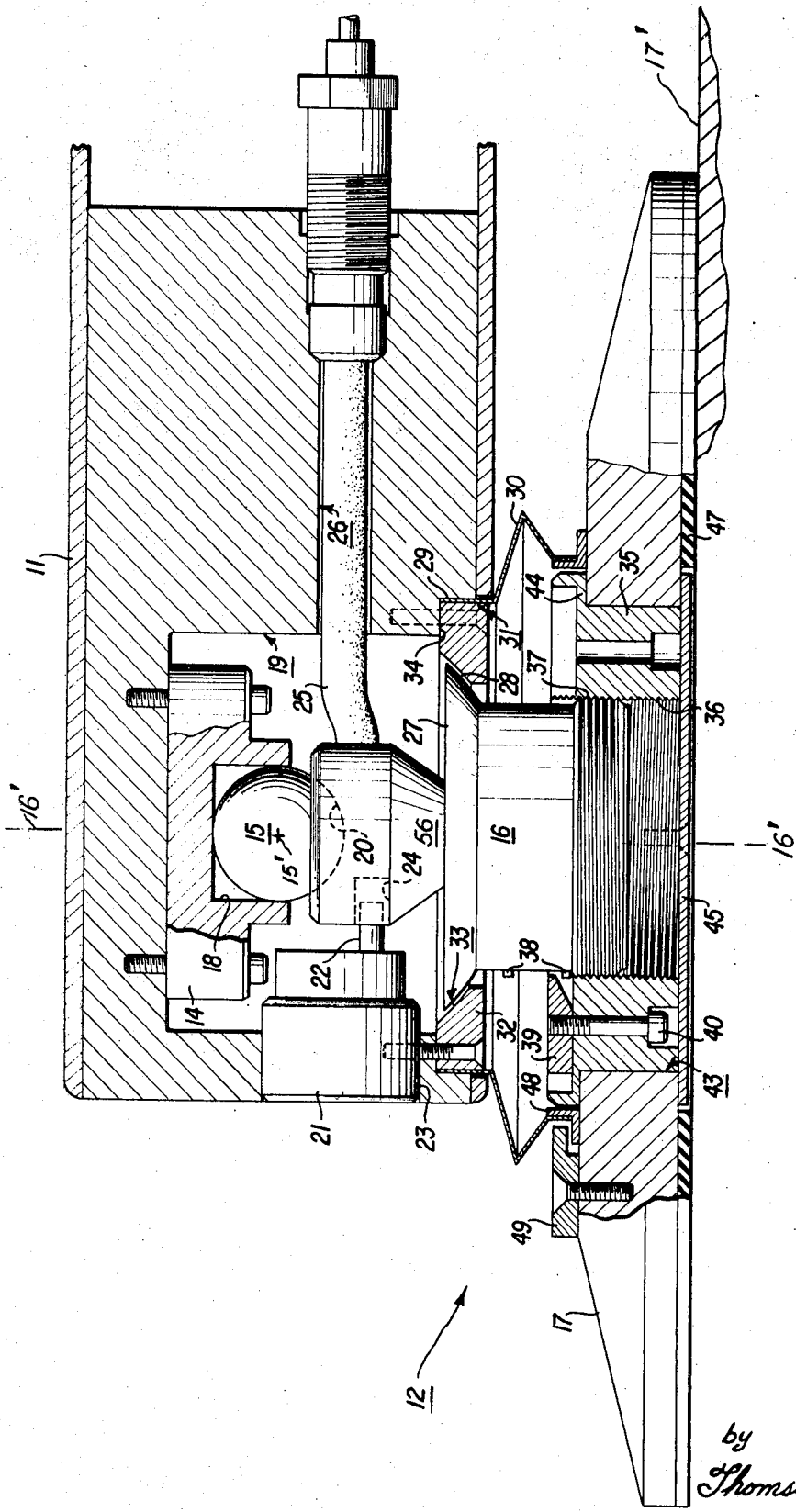
FIG. 3 is an enlarged detailed view taken along section line 3—3 of the scale shown in FIG. 1.

As is shown in greater detail in FIG. 3, each of the structural transducer units includes an adapter 14, a force-transmitting steel ball 15 held partly within a recess 18 in the adapter, and a load cell 16 supported on an underlying surface 17' by way of a cylindrical member 35 enclosed by the platform foot assembly 17. Adapter 14, which is a substantially cylindrical-shaped solid member having the recess 18 in the underside thereof, is secured, as by the illustrated screws, to an undersurface of the rigid platform 11, preferably in a large cavity or bore 19 formed therein to conserve height. Recess 18 is the adapter is of substantially the same diameter as the ball but has a depth less than its diameter, preferably such that about half of the ball 15 protrudes out of the adapter recess.

Figure 4:
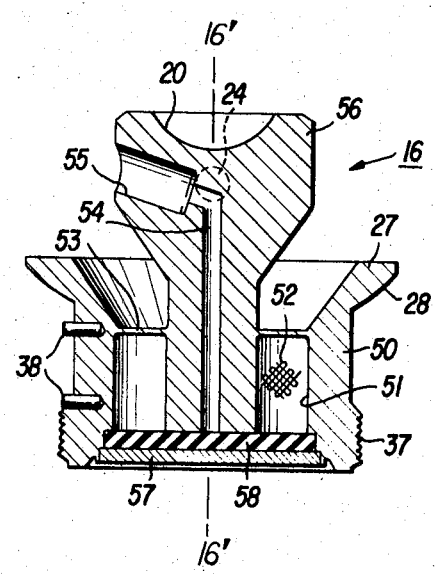
FIG. 4 presents a sectional view, in elevation, of a preferred load cell such as that shown in FIG. 3.

Load cell 16 is desirably of a shear-responsive type employing strain-sensitive electrical-resistance gauges which sense elastic shearing deformations in a load-transmitting element. Its construction favors accurate responses to loadings aligned with a central normally vertical axis 16'—16' (FIGS. 3 and 4). At its upper end, the protruding load-receiving portion 56 of cell 16 exhibits a semispherical cavity 20, which mates universally with the lower surface of the steel ball 15. A retainer plug assembly, 21, having a positioning pin 22 thereon, is held in the sidewall of the platform 11, and the load cell is angularly trapped, with but a limited freedom for angular movement about axis 16'—16', by the loose fit between pin 22 and a small radial bore 24 in the side of cell portion 56. Flexible cable 25, carrying electrical connections of the strain gauges within the load cell 16 with a suitable terminal box (not shown), is passed from the cell portion 56 through a bore 26 in the platform, and serves to apply the cell excitation and to bring its outputs to conventional types of load-indicating or recording instruments.

Assembly of the aforementioned components is best carried out while the platform is inverted, as is also the assembly of certain further parts which would otherwise tend to drop apart. In this connection, it may be seen that the load cell 16 is provided with an outer annular flange 27 having a spherically chamfered lower surface 28 which is trapped loosely by a cooperatively shaped ring 32. Before the latter is put into place, a thin cylindrical end 29 of a flexible cover boot 30 is fitted into a bore 31 formed coaxially with a smaller bore 19, in the bottom of the platform. Metallic ring member 32 has a spherically chamfered inner surface 33 shaped to mate with the lower surface of flange 27, and has an outer diameter substantially equal to that of the bore 31. Boot end 29 is squeezed between ring 32 and bore 31, and ring 32 is secured in place, by screws or the like, to a shoulder 34 appearing between the bores 19 and 31. Load cell 16 and steel ball 15 are thus maintained in an entrapped relation to the platform. An annular support member 35, having an inner threaded axial bore 36, is threaded onto an externally threaded surface 37 at the base of the load cell 16.

The spherical surfaces of cell flange 27 and the platform ring 32 are normally spaced from one another (as shown in FIG. 3) when the ball 15 is fully seated in adapter 14 and cell-loading portion 56, such that all of the platform load must pass through the cell, rather than bypass it, when the platform is in its upright position. However, because spherical surfaces 28 and 33 have a center of curvature 15' which is substantially the same as that of ball 15, the load cell is always isolated from undesirable lateral forces even if these surfaces should bind. Moreover, that same concentricity assures that the ball-and-socket joint will always be properly centered when the platform is rested on a support surface to make measurements.

Cover boot 30 is conveniently formed of thin metal, neoprene rubber or the like, and is in the form of a vertically expandable and collapsible bellows. While the lower end of the boot 30 is yet unattached, the entire boot may be compressed sufficiently to permit insertion of a stop key 39 over the upper wall of annular member 35, where it may be secured in place by a bolt 40, in a position where its tapered end extends radially inward as a stop disposed between the cooperating vertically spaced stop pins 38 protruding from the outside of cell 16. Foot or pad assembly 17 includes a frustoconically shaped broad area member having a central bore 43 of substantially the same diameter as the outside of the mated annular member 35, and it is fitted over the member 35 to abut its circumferential flange 44. A closure plate 45 covers the base end of the level-adjusting member 35, and is affixed to it in overlapping relation with the foot assembly 17 by screws or the like (not visible in the drawing views). An annular resilient pad 47 of rubber or the like is attached to the bottom of the foot assembly 17. The lower unattached end of the boot 30, having an angled annular piece 48 attached thereto, as by welding or adhesives bonding, is held to the upper surface of the foot assembly 17, as by a plurality of circumferentially spaced clips 49 bolted to the foot 17.

In levelling the platform 11, cover plate 45 is removed from one or more of the units 12, and the longitudinal position of the adjusting member 35 therein is set in relation to the load cell 16 by turning it about the axis 16'-16', as allowed by the aforementioned threading, using a spanner wrench or other suitable tool. Rotation of the load cell with the adjusting member 35 is prevented by the positioning pin 22 in the cell bore 24. Engagements of the stop key 39 with the stop pins 38 limit the heightwise adjustment of the cell, and, in the case of the lower stop pin, additionally prevents complete separation of the member 35 and pad 17 from the load cell 16.

In FIG. 4, a preferred form of shear-responsive load cell 16 for use in the weighing equipment of this invention is illustrated in detail. This cell includes a substantially cylindrical solid body 50 having a plurality of holes 51 bored therein along a circular line about the axis 16'-16' along which the load is applied, and electrical strain gauges 52 are bonded to the body surfaces defining the holes 51. The holes 51 are drilled to a predetermined depth so that the blind ends 52 thereof constitute thin integral sealing provisions. Radially extending sections left between the holes 51 constitute the shear sensing portions of the cell. An axial bore 54 communicates with the base of the cell interior, and with the gauge-containing holes 51, and with a radial bore 55 in the axially extending load-receiving portion 56. The lower part of the load cell is enclosed by a cover plate 57.

When a load is placed upon the platform 11, it is shared by all the cell units, and, in each, some of the load is transmitted through the steel ball 15 to the load cell 16. The outer portion of the load cell 16, outside the shear area defined by the circular array of holes 51, is rigid and is supported upon a surface 17' of an underlying structure by way of a load-supporting member 35 with which it is threadedly engaged. The inner load-receiving portion of the cell, inside the circular array of holes 51, applies forces from the ball 15 to the gauged shear-sensing sections of the load cell. Spherically chamfered surface 28 of the cell is normally slightly spaced from the spherically chamfered seat 33 of the metal ring 32 while the pad 17 rests on surface 17', thereby permitting limited free relative tilting movement between platform 11 and the cell 16 and foot 17. This universal seating arrangement for the load cell, including that of the ball 15 and socket 20 at the point of load transmission to the cell, tens to avoid errors which might otherwise be caused by unwanted lateral forces encountered during loading, an accommodates some tilting dictated by unevenness or nonlevel conditions of surface 17'. Essentially all vertical loading forces are directed along the longitudinal measurement axis of the cell, as they should be for accurate measurements, because of the ball-and-socket type seating, and this advantageously admits of the platform itself undergoing bending or sagging when heavily loaded. For the latter reason, the platform need not be as massive as it would have to be if its rigidity were critical. Strain gauges 52 are of course interconnected in a Wheatstone bridge array in a manner well known in the art, and are essentially responsive only to the vertical loading components, along the cell measurement axis 16'-16'. Each of the several units 12 makes an essentially independent weigh measurement at a different platform location, and these measurements combine to provide a precise measurement of the total weight or load which is applied, despite uncentered loadings on the platform.

It should be understood that the specific practices and preferred embodiments herein referred to have been offered by way of disclosure, rather than limitation, and that various modifications, additions and substitutions may be effected by those skilled in the art without departure from these teachings; it is therefore aimed in the appended claims to embrace all such variations as fall within the true spirit and scope of the invention.

We claim:

1. Electrical weighing apparatus comprising a load-receiving platform, a plurality of load cells equipped with electrical strain gauges and disposed at laterally spaced positions beneath the platform, each of said load cells having a load-receivng portion exposed at the top thereof and a support position means forming a ball-and-socket type vertically separable connections between said exposed load-receiving portion of each of said cells and an overlying part of said platform, a plurality of relatively broad area support pads affixed one each to the support portion of each of said load cells and vertically adjustable in relation thereto for supporting and said platform in a spaced and levelled relation above an underlying support surface, means loosely entrapping said support portion of each of said cells with said platform and preventing misalignment of said ball-and-socket type connection due to vertical separation thereof, and stop means on said platform and each of said load cells limiting relative angular movements between each of said cells and said platform about a substantially vertical axis.

2. Electrical weighing apparatus as set forth in claim 1 wherein said entrapping means comprises a peripheral annular flange about said support portion of each of said cells and a plurality of annular retainers secured with said platform one below each of said flanges, said flanges each having a lower spherically chamfered surface and each of said retainers having an upper spherically chamfered surface complementing that of the cooperating flange, thereby accommodating relative pivotal movements there between, said surfaces of said flanges and retainers being slight spaced vertically when said ball-and-socket type connections are fully mated and having substantially the same center of curvature as that of said ball-and-socket type connection.

3. Electrical weighing apparatus as set forth in claim 2 further comprising a flexible bellows-type boot associated with each of said load cells and connected at an upper end to the underside of said platform and at a lower end to said support pad in a surrounding and enclosing relation to said load cell.

4. Electrical weighing apparatus as set forth in claim 1 wherein each of aid ball-and-socket type connections includes a ball, a semispherical socket atop said load-receiving portion and means on the underside of said platform having a downwardly disposed recess for admitting and locating part of said ball therein, said ball being disposed partly in said socket and partly in said recess and entrapped therein.

5. Electrical weighing apparatus as set forth in claim 3 wherein said support portions of said load cells have substantially cylindrical external threaded surfaces, and wherein each of said support pads includes an internally threaded annular surface member engaged with the external threaded surface of an associated load cell, said annular member being mated coaxially with the remainder of said support pad in a relatively rotatable relation therewith about the longitudinal axis of said member and being fixed therewith in directions of said axis.

6. Electrical weighing apparatus as set forth in claim 1 wherein each of said stop means limiting said relative angular movements comprises a stop pin mounted on said platform, and means forming a recess extending laterally into said load cell, said recess being slightly larger than said pin and said pin extending laterally into said recess, and flexible electrical cable means supported by said platform and connected with said load cell and said strain guages thereof.

7. Electrical weighing apparatus as set forth in claim 1 wherein said platform has a plurality of downwardly directed recesses one at each of said laterally spaced positions, wherein said ball-and-socket type connections are disposed within said recesses and the support portions of said cells extend downwardly out of said recesses, and wherein each of said load cells has a substantially vertical loading axis and the strain guages thereof respond to shearing effects produced by loadings along said axis.